United States Patent [19]

Kida et al.

[11] Patent Number: 4,723,809
[45] Date of Patent: Feb. 9, 1988

[54] GLASS WINDOW FOR MOTOR VEHICLES

[75] Inventors: Hiroshi Kida; Yasuo Yamamoto, both of Osaka; Tadaaki Karino, Saitama, all of Japan

[73] Assignee: Nippon Sheet Glass Co., Ltd., Osaka, Japan

[21] Appl. No.: 25,321

[22] Filed: Mar. 11, 1987

[30] Foreign Application Priority Data

Mar. 28, 1986 [JP] Japan .............................. 61-45585[U]

[51] Int. Cl.$^4$ ............................................... B60J 1/00
[52] U.S. Cl. ............................... 296/84 R; 296/84 D; 296/201; 52/208
[58] Field of Search ............... 296/201, 146, 84 A, 296/84 D, 93, 84 R; 52/208

[56] References Cited

U.S. PATENT DOCUMENTS

| | | | |
|---|---|---|---|
| 4,072,340 | 2/1978 | Morgan | 296/84 R |
| 4,139,234 | 2/1979 | Morgan | 296/84 R |
| 4,364,595 | 12/1982 | Morgan et al. | 296/146 |
| 4,591,203 | 5/1986 | Furman | 296/93 |

FOREIGN PATENT DOCUMENTS

58/113480  7/1983  Japan .
58/113482  7/1983  Japan .

*Primary Examiner*—Robert R. Song
*Attorney, Agent, or Firm*—Bogucki, Scherlacher, Mok & Roth

[57] ABSTRACT

There is disclosed herein a glass window for use in motor vehicles which comprises a glass sheet, a glass frame integrally fitted over the peripheral edge of the glass sheet and sealingly mounted on a window frame of a vehicle body, a plurality of support members embedded in the glass frame and supporting the glass sheet and a plurality of retainers each partly embedded in the glass frame and joined to the support member, each retainer having one end secured to the window frame of the vehicle. Each support member is so configurated as to provide a predetermined space between the glass sheet and each corresponding retainer joined to the support member.

3 Claims, 9 Drawing Figures

GLASS WINDOW FOR MOTOR VEHICLES

BACKGROUND OF THE INVENTION

1. Field of the Invention

The present invention generally relates to glass windows for use in motor vehicles.

2. Description of the Related Art

A wide variety of glass windows have hitherto been proposed. For example, Japanese patent laid open No. 58/113480 discloses a glass window including a glass sheet and a glass frame formed from a rigid synthetic resin by injection molding and integrated over the peripheral edge of the glass sheet. This frame has a recess for receiving a glass sheet therein, and a projection extending outwardly of the recess in parallel to the glass sheet and serving as a seal to maintain sealing between the glass sheet and the window frame of a vehicle body. A plurality of bolts are partly embedded in the glass frame in spaced relation to the glass sheet.

In order to properly position the glass window relative to the window frame of the vehicle body, the bolts are first inserted into holes formed at the window frame. The glass window is then secured to the window frame by fastening nuts onto the bolts. However, there are a few disadvantages to such prior glass window. First, since the heads of the bolts are spaced away from the peripheral edge of the glass sheet, the bolts and thus, the glass sheet tend to be displaced unless otherwise the frame is of sufficient rigidity. Secondly, relative positioning of the glass sheet and the bolts is cumbersome during molding of the glass frame.

Another glass window is disclosed in Japanese patent laid open No. 58/113482. In the disclosed glass window, each supporting member of U-section is welded to the head of a bolt and is fitted with the peripheral edge of a glass sheet. A frame is formed from synthetic resins and is integrated over the peripheral edge of the glass sheet. This arrangement makes it easier to effect the relative positioning of the bolts and the glass sheet since the bolts are in direct contact with the glass sheet. However, the glass sheet is subject to damage in case of shock loads onto the vehicle body.

SUMMARY OF THE INVENTION

Therefore, it is an object of the present invention to provide an improved glass window for use in motor vehicles, which prevents breakage of a glass sheet due to shocts imposed on a vehicle body.

It is another object of the invention to provide a glass window for use in motor vehicles, which enables ready and accurate positioning of a glass sheet relative to bolts in the course of molding a glass frame.

According to the invention, there is provided a glass window for use in a motor vehicle, which comprises a glass sheet, a glass frame integrally fitted over the peripheral edge of the glass sheet and sealingly mounted on a window frame of a vehicle body, a plurality of support members embedded in the glass frame and supporting the glass sheet, and a plurality of retainers each partly embedded in the frame and joined to the support member, each retainer having one end secured to said window frame of the vehicle, each support member being configured to provide a predetermined space between the glass sheet and the retainer joined to the support member. With this arrangement, direct contact of the glass sheet and the retainers is prevented and thus, the glass sheet is refrained from being damaged or broken when shock loads are imposed on the vehicle.

According to a first embodiment of the invention, each retainer is in the form of a bolt. Each of the support members comprises a base to which the head of the bolt is joined, bent portions outwardly and upwardly bent from opposite ends of the base, and lateral flanges extending outwardly from the bent portions and supporting the glass sheet thereon.

According to a second embodiment of the invention, each of the support members is of a generally arcuate shape, and is adapted to support at opposite ends the glass sheet.

According to a third embodiment of the invention, each of the support members includes a base, a bent portion extending generally outwardly and upwardly from one end of the base, and a gripping portion extending from the bent portion and supporting the glass sheet therein.

Further objects, features and advantages of the present invention will become more apparent upon a consideration of the following description when taken in conjunction with the accompanying drawings wherein like reference numerals refer to like structural elements through the figures.

DESCRIPTION OF THE PREFERRED EMBODIMENTS

Figure 1:
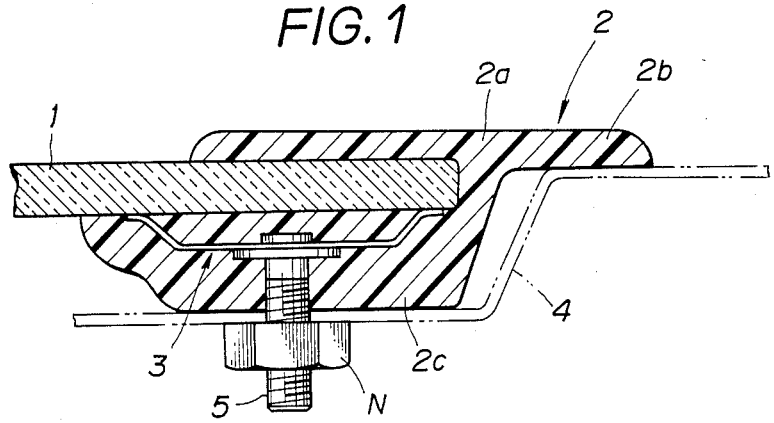
FIG. 1 is a partial sectional view of a glass window according to a first embodiment of the present invention.

With reference to the drawings and particularly to FIG. 1, there is illustrated a glass window according to a first embodiment of the invention. The glass window generally includes a glass sheet 1, a glass frame 2 formed from synthetic resins and integrally fitted over the peripheral edge of the glass sheet 1, a plurality of support members 3 for supporting the glass sheet thereon, and a plurality of suitable retainers, such as bolts 5, each having one end joined to the lower surface of the support member 3 by any suitable means such as welding and the other end being secured to a window frame 4 of a vehicle body by means of a nut N. The frame 2 has an upper portion 2a adapted to sealingly cover the upper surface of the glass sheet 1, a sealing portion 2b extending outwardly of the upper portion 2a in parallel to the glass sheet 1, and a lower portion 2c adapted to be in direct contact with the window frame 4 of the vehicle body. Each of the support members 3 and part of each bolt 5 are embedded in the lower portion 2c of the frame 2.

Figure 2:
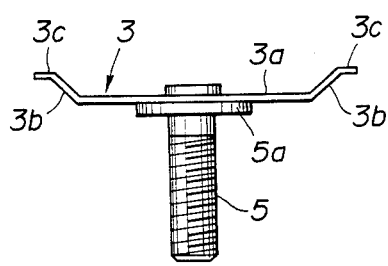
FIG. 2 is a front view of a support member and a bolt shown in FIG. 1.
Figure 3:
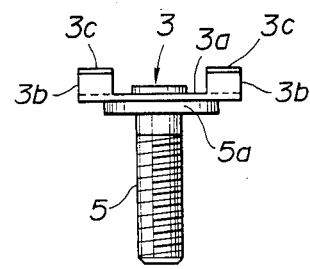
FIG. 3 is a side view of the support member and the bolt shown in FIG. 1.
Figure 4:
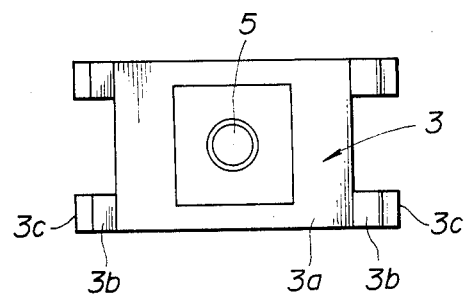
FIG. 4 is a plan view of the support member and the bolt shown in FIG. 1.

With reference to FIGS. 2 through 4, each support member 3 is in the form of a metal plate having a thickness of 0.3 to 1.0 mm. The support member 3 has a substantially rectangular base 3a to which the head of the bolt 5 is joined, a plurality of bent portions 3b bent outwardly and upwardly from opposite longitudinal ends of the base 3a, and a plurality of lateral flanges 3c extending outwardly and laterally from the outer ends of the bent portions 3b and adapted to support the glass sheet 1 thereon.

Figure 8:
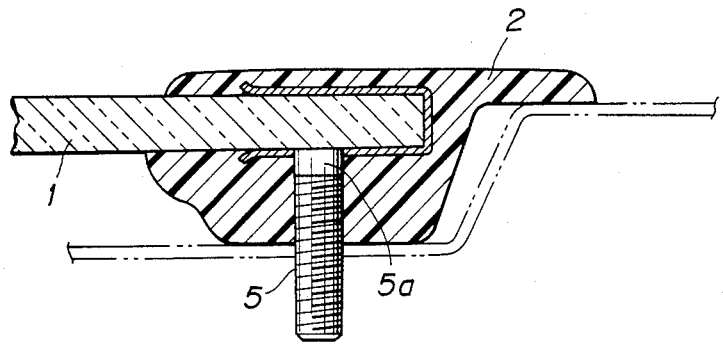
FIGS. 8 and 9 are partial sectional views of prior art glass windows, respectively.
Figure 9:
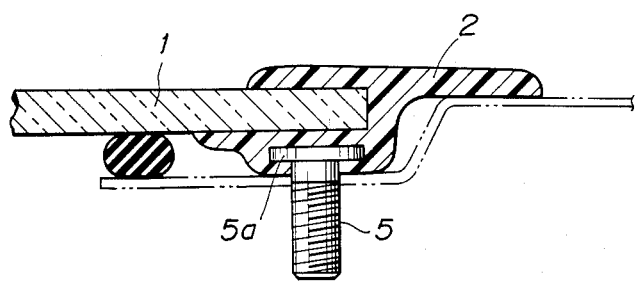

Reference is now briefly made to FIGS. 8 and 9. In a conventional glass window shown in FIG. 8, the glass sheet 1 is arranged in direct contact with the heads of the bolts 5a. Thus, the glass sheet 1 is likely to be damaged when shock loads are imposed on the vehicle body and thus, the bolts 5. In another conventional glass window shown in FIG. 9, the glass sheet 1 is arranged in spaced relation to the heads 5a of the bolts 5 in the frame. However, since the glass sheet 1 is supported only by the frame 2, it tends to be displaced unless the frame is of a sufficient rigidity. With reference again to FIGS. 2 through 4 the glass sheet 1, according to the invention, is sufficiently supported by the support member 3 while avoiding direct contact between the glass sheet 1 and the heads 5a of the bolts 5. Hence, the foregoing disadvantages of the conventional glass windows will not be encountered in the present invention.

Figure 5:
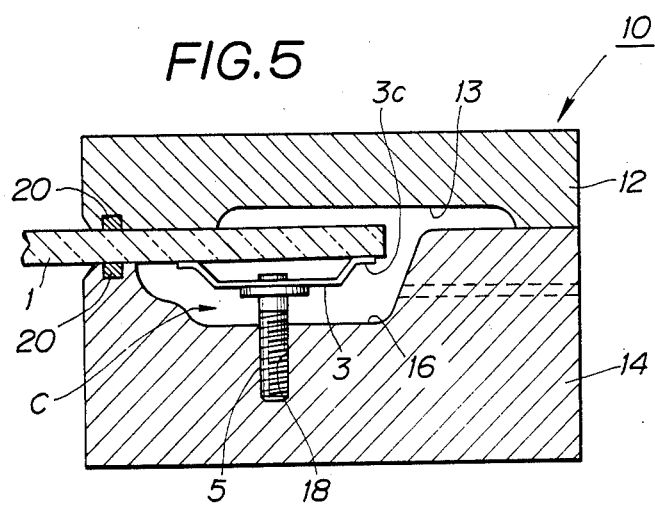
FIG. 5 is a sectional view showing a mold assembly for forming a frame for a glass sheet.

With reference now to FIG. 5, a mold assembly, generally designated at 10, includes an upper mold 12 having a recess 13 shaped to be complementary to the shapes of the upper and sealing portions 2a and 2b of the frame 2, and a lower mold 14 having a recess 16 shaped to be complementary to the shape of the lower portion 2c of the frame 2, and also positioning holes 18. In molding of the frame 2, the franges 3c of each support member 3 to which the bolt 5 is already joined are bonded, by an adhesive agent having a relatively low adhesive force, to the peripheral edge of the glass sheet 1. Free ends of the bolts 5 are then inserted into the respective holes 18 of the lower mold 14. The glass sheet 1 is sandwiched between the upper and lower molds 12 and 14 through seals 20 and tightly clamped together. thereafter, synthetic resins, mainly comprising polyor and/or polyisocyanate, are injection molded in a cavity C defined between the upper and lower molds 12 and 14 to form the frame 2 integrally with the glass sheet 1.

Figure 6:
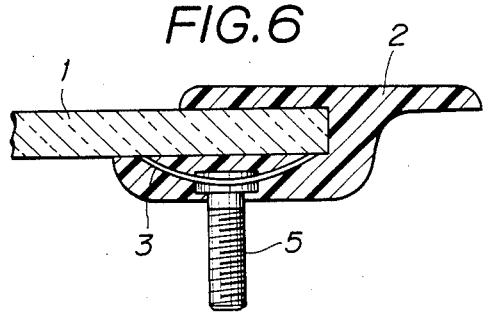
FIG. 6 is a partial sectional view of a glass window according to a second embodiment of the present invention.
Figure 7:
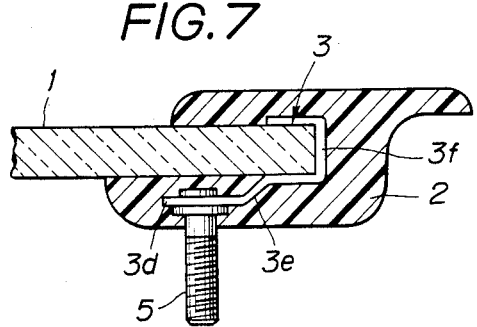
FIG. 7 is a partial sectional view of a glass window according to a third embodiment of the present invention.

FIG. 6 shows a second embodiment of the invention. In the illustrated embodiment, the support member 3 is of an arcuate shape. Each support member 3 is adapted to support at opposite ends the glass sheet 1 and is fixed at its center with the bolt 5. FIG. 7 shows a third embodiment of the invention. In this embodiment, each support member 3 includes a base 3d to which the bolt 5 is joined, a bent portion 3e bent outwardly and upwardly from one end of the base 3e, and a gripping portion 3f extending ourwardly from the bent portion 3e and supporting the glass sheet 1 therein. As is clear from FIGS. 6 and 7, the glass sheet 1 is arranged in spaced relation to the heads 5a of the bolts 5 and is sufficiently supported by the support member 3. Thus, the glass sheet 1 is prevented from being damaged when shack loads are imposed on the vehicle body.

It is understood that various changes and modifications may be mde from the specific illustrative embodiments without departing from the scope and spirit of the invention as defined by the appended claims.

What is claimed is:

1. A glass window for use in motor vehicles, comprising:
    a glass sheet;
    a glass frame integrally fitted over the peripheral edge of said glass sheet and sealingly mounted on a window frame of a vehicle body;
    a plurality of support members embedded in said glass frame and supporting said glass sheet, each support member comprising a base to which the head of said retainer is joined, bent portions generally outwardly and upwardly bent from opposite ends of said base, and lateral flanges extending generally horizontally and outwardly from said bent portions and supporting said glass sheet thereon; and
    a plurality of retainers each partly embedded in said frame and joined to said support member, each retainer having one end secured to said window frame of the vehicle,
    each of said support members being configured to provide a predetermined space between said glass sheet and each corresponding retainer joined to said support member.

2. A glass window for use in motor vehicles according to claim 1, wherein each support member is of a generally arcuate shape and is adapted to support at opposite ends said glass sheet.

3. A glass window for use in motor vehicles according to claim 1, wherein each support member comprises a base to which the head of said retainer is joined, a bent portion extending generally outwardly and upwardly from one end of said base, and a gripping portion extending from said bent portion and supporting said glass sheet therein.

* * * * *

UNITED STATES PATENT AND TRADEMARK OFFICE
CERTIFICATE OF CORRECTION

PATENT NO. : 4,723,809

DATED : February 9, 1988

INVENTOR(S) : Hiroshi Kida et al

It is certified that error appears in the above-identified patent and that said Letters Patent are hereby corrected as shown below:

Column 1, line 50, "shocts" should read --shocks--.

Column 3, line 9, "flangs" should read --flanges--.

Column 3, line 37, "franges" should read --flanges--.

Column 3, lines 44-45, "thereafter" should read --Thereafter--.

Column 4, line 6, "ourwardly" should read --outwardly--.

Column 4, line 12, "shack" should read --shock--.

Column 4, line 14, "mde" should read --made--.

Signed and Sealed this

Sixth Day of December, 1988

Attest:

DONALD J. QUIGG

*Attesting Officer*    *Commissioner of Patents and Trademarks*